United States Patent
Stepp et al.

(10) Patent No.: US 12,448,487 B2
(45) Date of Patent: Oct. 21, 2025

(54) POLYSILOXANES WITH RADIATION- AND MOISTURE-CROSS-LINKABLE GROUPS

(71) Applicant: Wacker Chemie AG, Munich (DE)

(72) Inventors: Michael Stepp, Überackern (AT); HyungDae Jin, San Ramon, CA (US); Ufuk Karabiyik, Ann Arbor, MI (US); Rabih Makki, Silverspring, MD (US)

(73) Assignee: Wacker Chemie AG, Munich (DE)

( * ) Notice: Subject to any disclaimer, the term of this patent is extended or adjusted under 35 U.S.C. 154(b) by 643 days.

(21) Appl. No.: 17/916,053

(22) PCT Filed: Apr. 14, 2020

(86) PCT No.: PCT/EP2020/060378
§ 371 (c)(1),
(2) Date: Sep. 30, 2022

(87) PCT Pub. No.: WO2021/209113
PCT Pub. Date: Oct. 21, 2021

(65) Prior Publication Data
US 2023/0167246 A1 Jun. 1, 2023

(51) Int. Cl.
*C08G 77/26* (2006.01)

(52) U.S. Cl.
CPC .................. *C08G 77/26* (2013.01)

(58) Field of Classification Search
CPC ........ C08G 77/26; C08G 77/18; C08G 77/20; C08G 77/388; C08G 77/392; C08G 77/28; C09D 183/08; C08K 5/07
See application file for complete search history.

(56) References Cited

FOREIGN PATENT DOCUMENTS

| | | |
|---|---|---|
| DE | 4120418 A1 | 12/1992 |
| DE | 102011081264 A1 | 2/2013 |
| JP | S54133600 A | 10/1979 |
| JP | H03281536 A | 12/1991 |
| JP | H06128379 A | 5/1994 |
| JP | H07165920 A | 6/1995 |
| JP | H108020 A | 1/1998 |
| WO | 2017201229 A1 | 11/2017 |
| WO | WO-2018162033 A1 * | 9/2018 ............. C08G 77/18 |
| WO | WO-2019005393 A1 * | 1/2019 ............. C08L 83/04 |
| WO | 2019028013 A1 | 2/2019 |

OTHER PUBLICATIONS

English Translation of WO-2018162033-A1 (Year: 2018).*
Charles E. Hoyle et Christopher Bowman, Angewandte Chemie, vol. 122, Chapter 2.1.1, p. 1584. Published by: VCH-Wiley GmbH & Co. KGaA, Weinheim, Germany.

* cited by examiner

*Primary Examiner* — Mark Eashoo
*Assistant Examiner* — Cullen L G Davidson

(57) ABSTRACT

An organo(poly)siloxane (A) consists of units of general formula (I) $R_nSiO_{(4-n/2)}$, where R is selected from the radicals $R^1$, $—OR^2$, $R^u$, $R^S$ and Q, wherein $R^1$ denotes a monovalent substituted or unsubstituted hydrocarbon radical having 1 to 18 carbon atoms, $R^2$ denotes a hydrogen atom or a monovalent substituted or unsubstituted hydrocarbon radical having 1 to 6 carbon atoms, $R^u$ denotes a monovalent aliphatic unsaturated hydrocarbon radical having 2 to 18 carbon atoms, $R^S$ denotes a monovalent thiol-functionalized hydrocarbon radical, Q is a nitrogen functional group of formula (II) $—CR^5R^6—NR^4R^3$, where $R^3$ and $R^4$ each independently denote hydrogen or a substituted or unsubstituted hydrocarbon radical, and $R^5$ and $R^6$ each independently denote hydrogen or the methyl radical. The organo(poly)siloxane (A) contains per molecule at least one unit of general formula (III) $Q-Si(OR^7)_2O_{1/2}$, at least 1 aliphatically unsaturated radical $R^u$, and at least 2 thiol-functionalized groups $R^S$.

11 Claims, No Drawings

POLYSILOXANES WITH RADIATION- AND MOISTURE-CROSS-LINKABLE GROUPS

CROSS-REFERENCE TO RELATED APPLICATION

This application is a U.S. National Phase Application of PCT/EP2020/060378, filed Apr. 14, 2020, the contents of which is hereby incorporated by reference in its entirety.

BACKGROUND

The invention relates to organo(poly)siloxanes that can be crosslinked both on exposure to moisture and through irradiation, and to organo(poly)siloxane mixtures comprising these organo(poly)siloxanes.

Organo(poly)siloxane compositions that cure via these two different crosslinking mechanisms are generally referred to as dual-cure systems and are already known. A problem with purely moisture-curing organo(poly)siloxane preparations is that the rate of the curing reaction of these preparations depends on the diffusion of water through the surface. Above a certain layer thickness, curing can no longer take place as quickly as on the surface, for example within a few seconds, which means that the curable organo (poly)siloxane preparation of this type is unsuitable for use in applications in which the adhesive or sealing properties of the substance need to be achieved within a short time. Conversely, radiation-curable organo(poly)siloxane mixtures have the disadvantage that, although they cure quickly when exposed to direct radiation, curing progresses only slowly in shadow areas.

To avoid these disadvantages, attempts have therefore been made to combine both types of crosslinking.

For example, this has been attempted by reacting OH-terminated polysiloxanes with trialkoxysilyl-functional acrylic derivatives. Reference is made here for example to WO17201229A1, in which organo(poly)siloxane compositions are described that, in addition to acrylic functional units, also have hydrolyzable groups, such as alkoxy radicals. For sufficiently rapid moisture crosslinking, it is necessary to add catalysts to these systems. In most cases these are tin compounds, which are of toxicological concern.

Whereas in this case the photo-crosslinking is based on an acrylic polymerization, there have been efforts to use free-radical-induced thiol-ene crosslinking for this purpose, since it has some advantages over acrylic crosslinking, for example less inhibition by atmospheric oxygen and the formation of a more homogeneous, tension-free network (see Hoyle, C. E., Bowman, C. N., Angew. Chem. 122, 1584 (2010), section 2.1.1).

WO2019/005393 and WO2019/028013 describe, by way of example, mixtures of polysiloxanes having aliphatically unsaturated radicals and polysiloxanes having thiol functions, each of which are able to bear moisture-crosslinkable alkoxy radicals. In this case, there is no migration of uncrosslinked portions in shadow areas, but the complication in producing two separate polymers is very high and reduces cost-effectiveness. In addition, the presence of a crosslinking catalyst is necessary, which can have an adverse effect on the storage stability of the mixture. For uses where there is contact with electronic components, metal-containing catalysts in particular are undesirable because of their ionic properties.

DE4120418A1 (WA9033S Wacker Chemie GmbH; issued on 20 Jun. 1991) describes one such system that contains both moisture-crosslinkable H-alkoxysilyl radicals and radiation-crosslinkable thioalkyl and vinyl radicals in one polymer. As a result, there is no migration of uncrosslinked constituents in shadow areas. For acceleration of moisture crosslinking, long-chain carboxylic acids such as oleic acid are sufficient as catalysts, but these have corrosive properties and an adverse effect on the storage stability of the ready-to-use overall mixture. After a short time, hydrogen evolution occurs even in closed containers, which leads to a build-up of pressure and to flammable gas mixtures when the pressure is released. These mixtures therefore constitute a safety risk.

BRIEF SUMMARY

Embodiments of an organo (poly) siloxane (A) are provided below. In an embodiment, the organo (poly) siloxane (A) consists of units of general formula (I)

$$R_nSiO_{(4-n/2)} \quad (I)$$

where
n is 0, 1, 2 or 3, wherein the proportion of units in which n=0 is not more than 50 mol % and the proportion of units in which n=1 is not more than 60 mol %, in each case based on all units of general formula (I),
R is selected from the radicals $R^1$, $-OR^2$, $R^u$, $R^S$ and Q, where
$R^1$ denotes a monovalent substituted or unsubstituted hydrocarbon radical having 1 to 18 carbon atoms,
$R^2$ denotes a hydrogen atom or a monovalent substituted or unsubstituted hydrocarbon radical having 1 to 6 carbon atoms,
$R^u$ denotes a monovalent aliphatic unsaturated hydrocarbon radical having 2 to 18 carbon atoms,
$R^S$ denotes a monovalent thiol-functionalized hydrocarbon radical having 1 to 18 carbon atoms,
Q is a nitrogen functional group of formula (II)

$$-CR^5R^6-NR^4R^3 \quad (II),$$

where
$R^3$ and $R^4$ each independently denote hydrogen or a substituted or unsubstituted hydrocarbon radical having 1 to 18 carbon atoms and
$R^5$ and $R^6$ each independently denote hydrogen or the methyl radical, with the proviso that the organo (poly) siloxane (A) contains per molecule at least one unit of general formula (III), $$Q-Si(OR^7)_2O_{1/2} \quad (III)$$

in which $R^7$ is as defined for $R^2$;
at least 1 aliphatically unsaturated radical $R^u$;
and at least 2 thiol-functionalized groups $R^5$.

DETAILED DESCRIPTION

The invention relates to organo(poly)siloxanes (A) consisting of units of general formula (I)

$$R_nSiO_{(4-n/2)} \quad (I)$$

where
n is 0, 1, 2 or 3, wherein the proportion of units in which n=0 is not more than 50 mol % and the proportion of units in which n=1 is not more than 60 mol %, in each case based on all units of general formula (I),
R is selected from the radicals $R^1$, $-OR^2$, $R^u$, $R^S$ and Q, where
$R^1$ denotes a monovalent substituted or unsubstituted hydrocarbon radical having 1 to 18 carbon atoms, $R^2$ denotes a hydrogen atom or a monovalent substituted or unsubstituted hydrocarbon radical having 1 to 6 carbon atoms, $R^u$ denotes a monovalent aliphatic unsaturated hydrocarbon radical having 2 to 18 carbon atoms, $R^S$ denotes a monovalent thiol-functionalized hydrocarbon radical having 1 to 18 carbon atoms, Q is a nitrogen functional group of formula (II)

$$-CR^5R^6-NR^4R^3 \qquad (II),$$

where $R^3$ and $R^4$ each independently denote hydrogen or a substituted or unsubstituted hydrocarbon radical having 1 to 18 carbon atoms and $R^5$ and $R^6$ each independently denote hydrogen or the methyl radical, with the proviso that the organo(poly)siloxane (A) contains per molecule at least one unit of general formula (III),

$$\text{Q-Si}(OR^7)_2O_{1/2} \qquad (III)$$

in which $R^7$ is as defined for $R^2$;
at least 2 aliphatically unsaturated radicals $R^u$;
and at least 2 thiol-functionalized groups $R^S$.

With the organo(poly)siloxanes (A), which contain both moisture-crosslinkable and radiation-crosslinkable groups in one molecule, it is possible to produce storage-stable organo(poly)siloxane compositions (M) that do not require catalysts for moisture crosslinking.

The radicals $R^1$ are preferably linear or branched, optionally substituted alkyl and aryl radicals having 1 to 18 carbon atoms, which may be interrupted by non-adjacent oxygen atoms.

Examples of radicals $R^1$ are alkyl radicals such as the methyl, ethyl, n-propyl, isopropyl, n-butyl, isobutyl, tert-butyl, n-pentyl, isopentyl, neopentyl, or tert-pentyl radical, hexyl radicals such as the n-hexyl radical, heptyl radicals such as the n-heptyl radical, octyl radicals such as the n-octyl radical, the 2-ethyl-1-hexyl radical, and isooctyl radicals such as the 2,2,4-trimethylpentyl radical, nonyl radicals such as the n-nonyl radical, decyl radicals such as the n-decyl radical, dodecyl radicals such as the n-dodecyl radical, hexadecyl radicals such as the n-hexadecyl radical, cycloalkyl radicals such as cyclopentyl, cyclohexyl, cycloheptyl, and methylcyclohexyl radicals, aryl radicals such as the phenyl and the naphthyl radical, alkaryl radicals such as o-, m- or p-tolyl radicals, xylyl radicals, and ethylphenyl radicals; aralkyl radicals such as the benzyl radical, the 2-phenyl-1-propyl radical or the alpha- and beta-phenylethyl radical.

Examples of substituted hydrocarbon radicals $R^1$ are alkoxyalkyl radicals such as the 2-methoxy-1-ethyl radical, the methoxymethyl radical, haloalkyl radicals such as the chloromethyl radical, the 3-chloropropyl radical, or the 3,3,3-trifluoropropyl radical, and acyloxyalkyl radicals such as the acetoxyethyl radical.

Particular preference is given to the methyl, phenyl and 3,3,3-trifluoropropyl radical, especially the methyl radical.

The radicals $R^2$ and RT are preferably monovalent, optionally substituted alkyl radicals having 1 to 6 carbon atoms. Examples of radicals $R^2$ and $R^7$ are alkyl radicals such as the methyl, ethyl, n-propyl, isopropyl, n-butyl, isobutyl or tert-butyl radical and also substituted radicals such as the 2-methoxy-1-ethyl or 2-n-butoxy-1-ethyl radical, particular preference being given to the methyl, ethyl, n-propyl, and isopropyl radical, especially the methyl and ethyl radical, very particularly preferably the ethyl radical on account of its lower toxicity.

Radical $R^u$ is preferably hydrocarbon radicals with at least one aliphatic carbon-carbon multiple bond and having 2 to 18 carbon atoms, which may also be substituted or interrupted by non-adjacent oxygen atoms.

Examples of radicals $R^u$ are the vinyl radical, allyl radical, 1-propen-1-yl radical, propargyl radical, allenyl radical, n-but-3-enyl radical, n-hex-5-enyl radical, n-undec-10-enyl radical, 3-allyloxyphenyl radical, 4-allyloxyphenyl radical, 4-allyloxy-2-methylphenyl radical, 4-allyloxybenzyl radical, 4-allyloxyphenoxyphenyl radical, and prop-2-ynoxy-n-propyl radical, radicals containing endocyclic carbon-carbon multiple bonds, such as the cyclopentenyl, cyclohexenyl, cycloheptenyl, cyclooctenyl, 2-cyclohexenyl-1-ethyl or 2-norbornenylethyl radical. The radical $R^u$ is preferably a vinyl or allyl radical, more preferably a vinyl radical.

The monovalent thiol-functionalized radicals $R^S$ are preferably thiol-functionalized hydrocarbon radicals, which may be interrupted by non-adjacent oxygen atoms, and have 1-18 carbon atoms and at least one SH group.

Examples of radical $R^S$ are $-(CH_2)_3SH$, $-(CH_2)_6SH$, $-(CH_2)_4CH(SH)CH_3$, 2-(3-mercapto-1-cyclohexyl)-1-ethyl, 2-(3,4-dimercapto-1-cyclohexyl)-1-ethyl, $-(CH_2)_3O(CH_2)_3SH$, $-(CH_2)_3OCH_2CH(SH)CH_2SH$, $-(CH_2)_3OCH_2CH(SH)CH_3$, $-(CH_2)_3OOCCH_2SH$, $-(CH_2)_3OOC(CH_2)_2SH$, $-(CH_2)_8SH$, $-(CH_2)_6CH(SH)CH_3$, $-(CH_2)_7SH$, $-CH_2SH$, $-(CH_2)_2SH$, $-(CH_2)_5CH=CH(CH_2)_5SH$, $-(CH_2)_5CH=CH(CH_2)_3CH(SH)CH_3$, $-(CH_2)_5CH(SH)(CH_2)_4CH=CH_2$, $-(CH_2)_6CH(SH)(CH_2)_3CH=CH_2$, $-(CH_2)_6CH(SH)(CH_2)_3CH(SH)CH_3$, $-(CH_2)_5CH(SH)(CH_2)_4CH(SH)CH_3$, $-(CH_2)_5CH(SH)(CH_2)_6SH$, $-(CH_2)_6CH(SH)(CH_2)_6SH$, 1-mercapto-4-cyclododec-8-enyl, 1-mercapto-5-cyclododec-8-enyl, 1,6-dimercapto-10-cyclododecyl, 1-mercapto-2-cyclobutyl, 1-mercapto-3-cyclobutyl, 1-mercapto-2-cyclopentyl, 1-mercapto-3-cyclopentyl, 1-mercapto-2-cyclohexyl, 1-mercapto-3-cyclohexyl, 1-mercapto-4-cyclohexyl, 1-mercapto-2-cycloheptyl, 1-mercapto-3-cycloheptyl, 1-mercapto-4-cycloheptyl, 1-mercapto-2-cyclooctyl, 1-mercapto-3-cyclooctyl, 1-mercapto-4-cyclooctyl, 1-mercapto-5-cyclooctyl, 1,2-dimercapto-4-cyclohexyl, 1-mercaptocyclohex-3-en-3-yl, 1-mercaptocyclohex-3-en-4-yl, 1-mercaptocyclohex-2-en-4-yl, $-(CH_2)_3SCH_2CH(SH)CH_2SH$, $-(CH_2)_3S(CH_2)_3SH$, -ortho-$(CH_2)_3OC_6H_4SH$, -meta-$(CH_2)_3OC_6H_4SH$, -para-$(CH_2)_3OC_6H_4SH$, -ortho-$(CH_2)_3OC_6H_4O(CH_2)_3SH$, -meta-$(CH_2)_3OC_6H_4O(CH_2)_3SH$, -para-$(CH_2)_3OC_6H_4O(CH_2)_3SH$, -ortho-$(CH_2)_3C_6H_4SH$, -meta-$(CH_2)_3C_6H_4SH$, -para-$(CH_2)_3C_6H_4SH$, -ortho-$C_6H_4SH$, -meta-$C_6H_4SH$, -para-$C_6H_4SH$, $-(CH_2)OOC(CH_2)_{11}SH$, and $-(CH_2)_3OOC(CH_2)_9CH(SH)CH_3$.

The radical $R^S$ is preferably a linear or cyclic thioalkyl radical having 1 to 8 carbon atoms, particular preference being given to linear thioalkyl radicals having 3 to 6 carbon atoms, especially $-(CH_2)_3SH$, $-(CH_2)_6SH$ and $-(CH_2)_4CH(SH)CH_3$.

The radicals Q of general formula (II) are of particular importance since their structure permits particularly rapid moisture crosslinking, which means that a catalyst can preferably be dispensed with.

The radicals $R^3$ and $R^4$ are preferably hydrogen, optionally substituted aliphatic hydrocarbons that may be interrupted by non-adjacent oxygen atoms, it being possible also for the radicals $R^3$ and $R^4$ to be incorporated into a cyclic structure, or optionally substituted aromatic hydrocarbons preferably having 1 to 8 carbon atoms. Examples of radicals $R^3$ and $R^4$ are alkyl radicals such as the methyl, ethyl, n-propyl, isopropyl, allyl, n-butyl, isobutyl, tert-butyl, n-pentyl, isopentyl, neopentyl or tert-pentyl radical, hexyl radicals such as the n-hexyl radical, heptyl radicals such as the n-heptyl radical, octyl radicals such as the n-octyl, 2,2,3,3-tetramethylbutyl or 2-ethyl-1-hexyl radical, cycloalkyl radicals such as the cyclopentyl or cyclohexyl radical, aryl radicals such as the phenyl radical, alkaryl radicals such as the o-, m-, or p-tolyl radicals, xylyl radicals, alkaryl radicals such as the benzyl radical, substituted alkyl radicals such as the 2-methoxyethyl radical, 2-ethoxyethyl radical, 2-isopropoxyethyl radical, 3-methoxypropyl radical, 3-ethoxypropyl radical, 3-isopropoxypropyl radical, 3-butoxypropyl radical or 2-(N,N-dimethylamino)ethyl radical, substituted aryl radicals such as the 4-methoxyphenyl radical, and heteroaromatics such as the 2-pyridyl radical, the N-imidazolyl radical or the 2-tetrahydrofuranyl radical. Examples of —NR$^4$R$^3$ units in which R$^3$ and R$^4$ are present in the form of a cyclic structure are the N-imidazolyl radical, N-pyrrolyl radical, N-3-pyrrolinyl radical, N-pyrrolidinyl radical, the N-piperidinyl radical, the N-4-methylpiperazinyl radical, the N-pyrrolidinonyl radical or the N-morpholinyl radical.

The NR$^4$R$^3$ units are particularly preferably a di-n-butylamino, anilino, cyclohexylamino or N-morpholino unit, very particularly preferably a di-n-butylamino or cyclohexylamino unit.

The radicals R$^5$ and R$^6$ are preferably hydrogen.

The organo(poly)siloxanes (A) of the invention are preferably linear, chain-form polysiloxanes composed of a total of on average preferably 10 to 400, more preferably 10 to 200, especially 10 to 100, units of general formula (I).

The proportion of units in which n=0 is preferably not more than 20 mol %, especially not more than 10 mol %, based on all units of general formula (I).

The proportion of units in which n=1 is preferably not more than 20 mol %, especially not more than 10 mol %, based on all units of general formula (I).

Preferably at least 0.5 mol % of all units of general formula (I) are a unit of general formula (III).

The proportion of alkoxy radicals OR$^7$ in the polysiloxanes (A) of the invention is preferably 1 to 40 mol %, more preferably between 2 and 15 mol %, especially between 2 and 10 mol %, based on all siloxane units of general formula (I).

The organo(poly)siloxane (A) of the invention preferably contains at least 1 aliphatically unsaturated radical R$^u$ and at least 2 thiol-functionalized radicals R$^S$. In order to ensure sufficient crosslinking density, the concentration of the radiation-crosslinkable radicals R$^u$ and R$^S$ is in each case preferably within a range of from 1-30 mol %, more preferably between 3 and 20 mol %, especially between 5 and 15 mol %, based on all siloxane units of general formula (I). The molar ratio of the radicals R$^S$ to the radicals R$^u$ is preferably within a range between 0.3 and 5, more preferably between 0.4 and 4, especially between 0.5 and 3.

The organo(poly)siloxanes (A) of the invention can be prepared by methods known in silicone chemistry. Preference is given to the condensation of alkoxysilanes of general formula (IV)

$$(R^2O)_3Si—CR^5R^6—NR^4R^3 \quad (IV)$$

with silanol groups of a polysiloxane (V) that contains both aliphatically unsaturated radicals R$^u$ and thiol-functionalized groups R$^S$. The preparation of this silanol-containing polysiloxane (V) is described for example in DE4120418A1. Because the thiol-functionalized groups R$^S$ are preferably incorporated into the polysiloxane skeleton via the corresponding thiol-functionalized alkoxysilanes, the polysiloxanes (V) may as a consequence of their preparation already contain alkoxy radicals, which are preferably retained in the condensation reaction with alkoxysilanes of general formula (IV).

In a preferred embodiment, the organo(poly)siloxane (A) has terminal units $(R^2O)_2R^1SiO_{(1/2)}$ that originate from the polysiloxane (V). In the organo(poly)siloxane (A), the ratio of units of general formula (III) to terminal units of formula $(R^2O)_2R^1SiO_{(1/2)}$ is preferably 20:80 to 90:10, more preferably 40:60 to 80:20.

Examples of alkoxysilanes of general formula (IV) are N,N-dimethylaminomethyltriethoxysilane, N,N-diethylaminomethyltriethoxysilane, N,N-diisopropylaminomethyltriethoxysilane, N,N-diethylaminomethyltriisobutoxysilane, N,N-diisopropylaminomethyltriisopropoxysilane, N-butylaminomethyltriethoxysilane, N,N-dibutylaminomethyltriethoxysilane, N-cyclohexylaminomethyltriethoxysilane, N-cyclohexyl-N-methylaminomethyltriethoxysilane, N-morpholinomethyltriethoxysilane, N-anilinomethyltrimethoxysilane, N-pyrrolidinomethyltriethoxysilane, 1-[(triethoxysilyl)methyl]-1H-pyrrole, 1-[(triethoxysilyl)methyl]-piperazine, 1-methyl-4-[(triethoxysilyl)methyl]piperazine, 1-[(triethoxysilyl)methyl]piperidine, and 1-[1-(triethoxysilyl)ethyl]-2-pyrrolidinone, particular preference being given to N,N-dibutylaminomethyltriethoxysilane, N-cyclohexylaminomethyltriethoxysilane, and N-morpholinomethyltriethoxysilane. It is also possible to use mixtures and/or partial hydrolysates or mixed partial hydrolysates of the silanes of general formula (IV) mentioned, alone or in a mixture with the silanes of general formula (IV).

The reaction of the polysiloxane (V) with the alkoxysilane of general formula (IV) is preferably carried out at room temperature and atmospheric pressure. Because of the high reactivity with atmospheric moisture both of the newly formed units of general formula (III) and of the alkoxysilanes of general formula (IV), the reaction is preferably carried out with exclusion of moisture, for example in a dry nitrogen atmosphere. In order to convert the silanol groups present in the polysiloxane (V) as completely as possible into units of general formula (III), a stoichiometric excess of the alkoxysilane (IV) relative to the silanol groups is preferably used. This excess is preferably at least 5 mol %, more preferably at least 20 mol %, especially at least 50 mol %. The excess alkoxysilane can after the reaction optionally be distilled off under reduced pressure.

Preferably, it remains in the mixture. In order for excess alkoxysilane (IV) to be able to influence the crosslinking rate and the modulus of the vulcanizate formed during moisture curing, it can even sometimes be advantageous to use a higher proportion of alkoxysilane (IV) in the condensation reaction from the outset, and to leave the excess in the crosslinkable organo(poly)siloxane mixture (M).

The use of solvents can be advantageous in the reaction when the viscosity of the mixture is very high and/or the alkoxysilane of general formula (IV) is a solid. Preference is given to using solvents without OH groups, so as to avoid exchange of the alkoxy groups in the alkoxysilane (IV) and in the organo(poly)siloxane (A), which could alter the reactivity. Solvents having alcoholic OH groups can be used when complete or partial replacement of the alkoxy groups present in the alkoxysilane (IV) is desired, for example to reduce reactivity. The type and molar ratio and the reaction conditions such as time, temperature, and pressure must then be adjusted accordingly as necessary. During or after the reaction, the alcohol released from the silane of general formula (IV), together with any excess of the added solvent containing alcoholic OH groups, is preferably distilled off completely or in part.

Examples of solvents are alkanes such as for example pentane, isopentane, hexane, heptane, and isooctane or mixtures thereof, aromatics such as for example benzene, toluene, xylenes, and mesitylene, halogenated hydrocarbons such as for example methylene chloride, chloroform, and 1,2,3-trichloropropane, carboxylic esters, such as for example butyl acetate and ethyl acetate, ethers such as for example diethyl ether, tetrahydrofuran, 2-methyltetrahydrofuran, methyl tert-butyl ether, anisole, and dibutyl ether or mixtures of different solvents. Examples of solvents having alcoholic OH groups are ethanol, n-propanol, isopropanol, n-butanol, isobutanol, 2-butanol, n-pentanol, propane-1,2-diol, propane-1,3-diol, and glycerol.

It is possible to react with one another both mixtures of different polysiloxanes (V) and mixtures of alkoxysilanes of general formula (IV). Reacting a polysiloxane (V) successively with more than one alkoxysilane (IV) is also possible. A major advantage of the invention is that catalysts are not required either for the condensation reaction of the polysiloxane (V) with the alkoxysilane (IV) or for moisture crosslinking. Both proceed at room temperature within a few minutes to a few hours.

The invention also provides moisture- and radiation-crosslinkable organo(poly)siloxane mixtures (M) comprising organo(poly)siloxanes (A).

The high reactivity means that moisture must be excluded during storage of the organo(poly)siloxanes (A) of the invention and in mixtures (M) in which they are present.

The photo-crosslinking in the organo(poly)siloxane mixture (M) is based on a free radical reaction. Therefore, the organo(poly)siloxane mixture (M) preferably comprises photoinitiators (B). The photoinitiators useful for the present invention may be selected from any known type that forms free radicals when irradiated. Suitable photoinitiators include UV initiators such as benzophenone and substituted benzophenones, acetophenone and substituted acetophenones, benzil and its dialkyl ketals, benzoin and its alkyl ethers, diacylphosphane oxides, especially dibenzoylphosphane oxides, xanthone, and substituted xanthones. Typical representatives are acetophenone, 2-ethoxy-2-m ethylacetophenone, trichlorobutylacetophenone, 2-ethoxy-2-phenylacetophenone, mesityl oxide, propiophenone, benzophenone, xanthone, diethoxyacetophenone (DEAP), benzoin methyl ether, benzoin ethyl ether, benzoin isopropyl ether, diethoxyxanthone, thioxanthone, 3-chloroxanthone, chlorothioxanthone, isopropylthioxanthone, fluorenone, benzaldehyde, fluorene, anthraquinone, carbazole, N-vinylcarbazole, 3-methylacetophenone, 4-methylacetophenone, 3-bromoacetophenone, 4-methylbenzophenone, 4-chlorobenzophenone, 4,4-dimethoxybenzophenone, 2-methyl-1-[4-(methylthio)phenyl]-2-morpholinopropan-1-one, azobisisobutyronitrile, N-methyldiethanolamine-benzophenone, benzil dimethyl ketal, 2-hydroxy-2-methylpropiophenone (known as Darocur® 1173), 2-hydroxy-2-methylpropiophenone, phenylbis(2,4,6-trimethylbenzoyl)phosphane oxides, and combinations thereof. The choice of photoinitiator depends on the thickness of the layer/application, the irradiation wavelength, and the desired curing rate, and also on the miscibility with the other components of the formulation. For UV wavelengths below 350 nm, preference is given to using photoinitiators of the alpha-hydroxyketone type. The photoinitiator is used in a concentration that permits curing conditions that are optimal for the respective requirements. Preferred ranges comprise about 0.05 to about 5 percent by weight, more preferably about 0.1 to about 1 percent by weight, based on the total weight of the organo(poly)siloxane composition (M).

To avoid unwanted free-radical reactions, stabilizers (C) that prevent such side reactions, such as hydroquinone, hydroquinone monomethyl ether (MEHQ), 4-tert-butylpyrocatechol, 4-nitrophenol, and butylated hydroxytoluene (BHT), are added to the organo(poly)siloxane mixtures (M) of the invention.

The organo(poly)siloxane mixtures (M) may also comprise fillers (D), which can be added to optimize the rheological properties of the uncrosslinked mixture or the vulcanizate properties. Examples of such fillers are precipitated or highly disperse silicas such as HDK®, chalks, quartzes, organic fillers such as starch, cellulose, microcellulose where appropriate, bamboo fibers, polyethylene fibers, and polyacrylonitrile powder. Certain solids can also be added to alter the electrical or thermal conductivity. Examples are carbon black, graphene, carbon nanotubes, metal powders such as aluminum, iron, silver, copper or gold powder, aluminum hydroxide, aluminum oxides, titanium dioxide, iron oxides, glass beads, barium sulfate, sodium sulfate, magnesium sulfate, calcium sulfate, calcium carbonate, calcium silicate, apatite, barium titanate, silicon, silicon carbide, silicon nitride, boron nitride or boron carbide. It is also possible to use more than one different filler. Their proportion in the organo(poly)siloxane mixture (M) ranges between 0 and 70%, depending on use.

Further additives (E) are for example dyes such as fluorescent markers, such as Tinopal OB (BASF), KB-140, and KB-6002 (Kustom Group), fluoranthene, coumarin 120, pyrene derivatives, and perylene. Adhesion promoters (E) such as Wacker® adhesion promoter AMS 70, Geniosil® series: GF31, GF62, GF91, GF92, GF93, GF95, and GF96 or epoxy-functional compounds such as Dynasylan® Glymo, epoxy-functional polysiloxanes or their partial hydrolysates, individually or as a mixture, can also be added to improve the adhesion of the vulcanizates of the organo(poly)siloxane mixture (M) to printed circuit boards or metal substrates, for example.

To modify the viscosity and the curing behavior and also the hardness of the vulcanizate, what is known as a reactive diluent can also be added to the organo(poly)siloxane mixture (M). This should preferably be miscible with an organo(poly)siloxane of the organo(poly)siloxane mixture (M) and react during the crosslinking process in such a way that it becomes part of the vulcanizate formed through the crosslinking of the mixture of the invention. The term reactive diluent does not mean per se that the addition of this additive results in a reduction in the viscosity of the organo(poly)siloxane mixture (M) of the invention, but merely means that the basic constituent, the organo(poly)siloxane (A), is diluted. This can be for economic reasons or to help improve the property profile.

Examples of reactive diluents are thiol-functionalized alkoxysilanes such as for example 3-thiopropyltrimethoxysilane, 3-thiopropylmethyldimethoxysilane, or partial hydrolysates thereof or co-partial hydrolysates thereof with other alkoxysilanes such as methyltrimethoxysilane, n-hexadecyltrimethoxysilane or vinyltrimethoxysilane, or thiol-functionalized organic crosslinkers such as pentaerythritol tetrakis(3-mercaptopropionate), pentaerythritol tetrakis(2-mercaptoacetate), pentaerythritol tetrakis(3-mercaptobutylate) or trimethylolpropane tris(2-mercaptoacetate), or alkoxysilanes of general formula (IV) or partial or cohydrolysates thereof, and also non-functional alkoxysilanes (for example tetraethoxysilane, dimethyldimethoxysilane, methyltriethoxysilane, methyltrimethoxysilane, ethyltrimethoxysilane, ethyltriethoxysilane, vinyltrimethoxysilane, vinyltriethoxysilane, allyltriethoxysilane, allyltrimethoxysilane, n-hexadecyltrimethoxysilane, n-octyltriethoxysilane, n-octyltrimethoxysilane, 2,2,3,3-tetramethylbutyltrimethoxysilane, 2,2,3,3-tetramethylbutyltriethoxysilane) or hydrolysates or partial hydrolysates thereof, silicone resins, preferably having crosslinkable alkoxy groups and optionally vinyl groups and/or thiol groups, silicone oils, preferably ones that undergo moisture crosslinking under conditions comparable to those of the organo(poly)siloxanes (A) of the invention, as described for example in WO2018/162033 A1 and reactive organic polymers as described in DE102011081264 A1. Moisture crosslinkability also allows crosslinking in shadow areas and prevents the undesirable subsequent migration of uncrosslinked constituents from the vulcanizate. For this reason, preference is given to using additives that are moisture-crosslinkable under conditions similar to those of the organo(poly)siloxanes (A) of the invention. Such reactive diluents are used in the organo (poly)siloxane mixtures (M) in proportions of preferably not more than 50% by weight, more preferably not more than 30% by weight, especially not more than 10% by weight. Where it is also possible for the added reactive diluent to also take part in the radiation curing by virtue of the presence of aliphatically unsaturated radicals and/or thiol functions, the corresponding aliphatically unsaturated radicals should preferably be in stoichiometric balance with the thiol functions.

Solvents can also be used to lower the viscosity and/or to improve the miscibility of the individual components of the organo(poly)siloxane mixture (M). The same solvents can be considered for this as those described above for the process step of the condensation of polysiloxane (V) and alkoxysilane of general formula (IV). These are preferably largely evaporated after application but before curing. The term solvent does not mean that all components have to dissolve therein. Preferably, solvent is used in the organo (poly)siloxane mixture (M) in proportions of from 0% to 50% by weight, more preferably 0% to 30% by weight, especially 0%.

For the preparation of the organo(poly)siloxane mixture (M), all the constituents of the relevant mixture can be mixed with one another in any order. Mixing preferably takes place at room temperature.

If the organo(poly)siloxane mixtures (M) are prepared from more than one component, storage in the presence of moisture should be excluded in the case of components that contain siloxane units of general formula (III); in the case of components that contain $R^S$ and $R^u$ radicals, storage should be with protection from light.

When the organo(poly)siloxane mixtures (M) consist of a single component, storage with exclusion of moisture and light rays should be ensured.

The organo(poly)siloxane mixtures (M) have a viscosity at 25° C. of preferably 1 to 100 000 mPa·s, more preferably 30 to 5000 mPa·s, especially 30 to 1000 mPa·s. The organo (poly)siloxane mixtures (M) can be used for all purposes for which compositions that are crosslinkable on exposure to moisture and/or through irradiation have been used to date, especially for the production of coatings.

Examples of substrates onto which the mixtures of the invention can be applied to produce coatings are electronic printed circuit boards, motherboards, ceramic objects or glass, including glass fibers, which in turn include optical fibers, paper such as kraft paper or glassine paper, cardboard including boards made from asbestos, cellophane, wood, cork, plastic films, for example silicone films, polyethylene films or polypropylene films, PET films, woven or nonwoven fabric made of natural fibers or synthetic organic fibers or glass fibers, metals such as aluminum foils, polyethylene-coated kraft paper or polyethylene-coated cardboard. Where polyethylene has been mentioned above, it can in each case mean high-, medium- or low-pressure polyethylene.

The organo(poly)siloxane mixtures (M) may be applied to the substrate to be coated in any way that is suitable and well known for the production of coatings from liquid substances, for example by dipping, brushing, pouring, spraying, rolling, knife coating or squeegee coating.

The organo(poly)siloxane mixtures (M) are extremely suitable for embedding electrical or electronic components.

Examples of electronic components that can be embedded using the organo(poly)siloxane mixtures (M) are hybrid circuits, for example for electronic ignitions, modules, photovoltaic solar generators, and other semiconductor arrays. Preferably, the organo(poly)siloxane mixtures (M) are pre-crosslinked by ultraviolet light when used for producing coatings or for embedding electrical or electronic components, the irradiation time preferably being chosen so as to produce a surface on the vulcanizate that is dry to the touch. Post-crosslinking of the irradiated parts of the vulcanizate or crosslinking in shadow areas then takes place through moisture crosslinking of the siloxane units of general formula (III) present in the organo(poly)siloxane mixtures (M), preferably in air. The higher the proportion of siloxane units of general formula (III) in the organo(poly)siloxane mixture (M) and the higher the relative humidity, the greater the rate of this crosslinking.

The radiation curing of the organo(poly)siloxane mixtures (M) is preferably effected by irradiation in a commercial irradiation apparatus in the frequency range of UV light.

The irradiation conditions such as intensity and duration can here be readily adapted by those skilled in the art to the circumstances and requirements. The examples describe typical conditions that lead to rapid skin formation up to deep curing in the mm range. However, they should not be regarded as limiting.

The viscosity is in the context of the present invention determined in accordance with ISO 2555 after heating to 23° C. with a DV 3 P rotational viscometer from A. Paar (Brookfield systems) using spindle 5 at 2.5 rpm.

All viscosity data relate to a temperature of 23° C., which is referred to also below as room temperature.

EXAMPLES

Example 1 (Preparation of a Polysiloxane (V) with SH:Vi~2.5:1)

A 0.5 l flange flask with magnetically coupled glass paddle stirrer, dropping funnel, thermometer, and reflux condenser with column head is charged with 18.7 g of vinylmethyldichlorosilane (99%, Wacker Chemie AG), and 152.2 g of an α,ω-dihydroxydimethylpolysiloxane having an average of 27 dimethylsiloxy units (Wacker Chemie AG) is metered in at 25-27° C. over the course of 20 minutes. 0.16 g of 3,5-di-tert-butyl-4-hydroxytoluene (99%, Sigma-Aldrich) is added as stabilizer and the mixture is then heated to 100° C. and stirred at this temperature for one hour. 0.54 g of "PNCl$_2$" (Wacker Chemie AG, equilibration catalyst) is then added. 45 g of 3-thiopropylmethyldimethoxysilane 95%, Sigma-Aldrich) is metered into the clear reaction mixture over a 20-minute period and then another 0.54 g of "PNCl$_2$" is added. The mixture is stirred at 100° C. for a further 2 hours, cooled to 80° C., and 30 g of 1% hydrochloric acid added, after which it is stirred for 15 minutes and a suspension of 4 g of magnesium oxide in 20 g of deionized water then added. The reaction mixture is then stirred at 80° C. for one hour, after which all the volatiles are distilled off at 1 hPa up to 110° C. The residue is cooled to room temperature and then filtered through a pressure suction filter. A clear liquid having a viscosity of 65 mPa·s is obtained as the filtrate.

The composition of the product is determined by $^1$H and $^{29}$Si NMR. This gives the following average composition:

X-Me$_2$SiO$_{1/2}$:X-MeViSiO$_{1/2}$:Me$_2$SiO$_{2/2}$:MeViSiO$_{2/2}$:MeSi(CH$_2$CH$_2$CH$_2$—SH)O$_{2/2}$=1.9:0.1:29.5:2:5.1

X=54% OH, 46% OMe

After storage for 6 months at room temperature in an amber glass bottle, the viscosity had increased only to 76 mPa·s.

Example 1a (Preparation of a Polysiloxane (V) with SH:Vi 2.5:1)

Example 1 is repeated, but using 33 g of 9% hydrochloric acid instead of 30 g of 1% hydrochloric acid.

Workup in analogous manner results in the isolation of an oily liquid having a viscosity of 1203 mPa·s, which according to NMR spectra has the following average composition:

X-Me$_2$SiO$_{1/2}$:X-MeViSiO$_{1/2}$:Me$_2$SiO$_{2/2}$:MeViSiO$_{2/2}$:MeSi(CH$_2$CH$_2$CH$_2$—SH)O$_{2/2}$=1.8:0.2:116.6:6.6:16.4

X=95% OH, 5% OMe

After storage for 5 weeks of at room temperature in an amber glass bottle, the polymer had crosslinked to form a clear gel. A lower residual methoxy content is disadvantageous for the storage stability of the polysiloxane (V).

Example 2 (Preparation of a Polysiloxane (V) with SH:Vi~1:2)

A 1 l 4-necked flask with magnetically coupled glass paddle stirrer, dropping funnel, thermometer, and reflux condenser with column head is charged with 18.7 g of vinylmethyldichlorosilane (99%, Wacker Chemie AG), and 47.7 g of an α,ω-dihydroxydimethylpolysiloxane having a 25 mol % proportion of methylvinylsiloxy units (Wacker Chemie AG) is metered in at 24° C. over the course of 10 minutes. 104.5 g of an α,ω-dihydroxydimethylpolysiloxane having an average of 27 dimethylsiloxy units (Wacker Chemie AG) is then added over the course of 20 minutes. 0.16 g of 3,5-di-tert-butyl-4-hydroxytoluene (99%, Sigma-Aldrich) is added as stabilizer and the mixture is then heated to 100° C. and stirred at this temperature for one hour. 0.5 g of trifluoromethanesulfonic acid (Merck) is then added. 22.7 g of 3-thiopropylmethyldimethoxysilane 95%, Sigma-Aldrich) is metered into the clear reaction mixture over a 20-minute period and then another 0.5 g of trifluoromethanesulfonic acid is added. The mixture is stirred at 100° C. for a further 2 hours, cooled to 80° C., and a suspension of 4 g of magnesium oxide in 46.6 g of deionized water is added. The reaction mixture is then stirred at 80° C. for one hour, after which all the volatiles are distilled off at 1 hPa up to 110° C.

The residue is cooled to room temperature and then filtered through a pressure suction filter. A clear liquid having a viscosity of 473 mPa·s is obtained as the filtrate.

The composition of the product is determined by $^1$H and $^{29}$Si NMR. This gives the following average composition:

X-Me$_2$SiO$_{1/2}$:X-MeViSiO$_{1/2}$:Me$_2$SiO$_{2/2}$:MeViSiO$_{2/2}$:MeSi(CH$_2$CH$_2$CH$_2$—SH)O$_{2/2}$=1.6:0.4:48.2:6.7:4

X=67% OH, 33% OMe

Example 3 (Preparation of an Organo(Poly)Siloxane (A) with SH:Vi~1:2)

60 g of polysiloxane from example 2 is mixed with 18.6 g of N,N-di-n-butylaminomethyltriethoxysilane at room temperature while stirring. Immediately thereafter, $^1$H- and $^{29}$Si-NMR spectra of the clear mixture are recorded. The molar ratio of the individual siloxy units is calculated from the integrals. Normalization to 2 end groups gives the following composition:

MeO-Me$_2$SiO$_{1/2}$:MeO-MeViSiO$_{1/2}$:Me$_2$SiO$_{2/2}$:MeViSiO$_{2/2}$:MeSi(CH$_2$CH$_2$CH$_2$—SH)O$_{2/2}$:(nBu)$_2$N—CH$_2$—Si(OEt)$_2$O$_{1/2}$:(nBu)$_2$N—CH$_2$—Si(OEt)$_3$=0.5:0.2:46.3:6:3.7:1.3:3.4

According to this, all the SiOH groups have reacted with the trialkoxysilane, whereas the excess amount of silane and the methoxy end groups are present unchanged.

Example 4—Crosslinking Tests 10 g of product from example 3 is mixed with 1 g of a tetraethoxy partial hydrolysate (Wacker TES40), 4 g of a silicone resin (MQ resin 803), and 0.2 g of photoinitiator Darocur® 1173 (Sigma-Aldrich, 2-methyl-1-phenyl-propan-2-ol-1-one). A portion of the clear mixture having a viscosity of 709 mPa·s is poured into a glass trough in a layer thickness of approx. 0.1 mm and, upon UV irradiation in a UV chamber (Uvacube, Hönle, Hg halide lamp, 290-415 nm, 2000 W), undergoes crosslinking to a clear vulcanizate within 15 seconds.

Without irradiation, a dry, tack-free skin forms on the surface of the mixture in air within approx. 45 minutes and the sample is fully crosslinked after a few hours.

Example 5 (Preparation of an Organo(Poly)Siloxane (A) with SH:Vi~1:2)

A 0.5l 3-necked flask with magnetically coupled glass paddle stirrer, dropping funnel, thermometer, and reflux condenser with column head is charged with 207.5 g of an α,ω-dihydroxydimethylpolysiloxane having an average of 420 dimethylsiloxy units (Wacker Chemie AG, CT 6000), and 94.6 g of an α,ω-dihydroxydimethylpolysiloxane having a 25 mol % proportion of methylvinylsiloxy units (Wacker Chemie AG) is added. 37.1 g of vinylmethyldichlorosilane (99%, Wacker Chemie AG) is then metered in over the course of 25 minutes. 0.3 g of 3,5-di-tert-butyl-4-hydroxytoluene (99%, Sigma-Aldrich) is added and the mixture is heated to 100° C. and stirred at this temperature for approx. 25 minutes. 0.4 g of a 10% solution of "PNCl2" in toluene is added and the mixture is then stirred at 100° C. for a further 2 hours.

45 g of 3-thiopropylmethyldimethoxysilane 95%, Sigma-Aldrich) is metered into the now-clear reaction mixture over a 30-minute period and then another 0.4 g of the 10% "PNCl2" solution is added. The mixture is stirred at 100° C. for a further 2 hours, cooled to 80° C., and a suspension of 7.9 g of magnesium oxide in 92.7 g of deionized water is added. Stirring is continued for a further 75 minutes at 80° C. and then the mixture is allowed to cool. On being left to stand, the reaction mixture separates into an oil phase and a water phase. The solids are separated from the oil phase by centrifuging at 5000 rpm and the clear liquid is then heated at 5 hPa up to 110° C.

A clear liquid having a viscosity of approx. 1500 mPa·s is isolated. The composition of the product is determined by $^1$H and $^{29}$Si NMR. This gives the following average composition:

X-Me$_2$SiO$_{1/2}$:X-MeViSiO$_{1/2}$:Me$_2$SiO$_{2/2}$:MeViSiO$_{2/2}$: MeSi(CH$_2$CH$_2$CH$_2$—SH)O$_{2/2}$=1.58:0.42:45.3:6.2:3.7

X=53% OH, 47% OMe

Example 6a (Preparation of an Organo(Poly)Siloxane (A) with SH:Vi~1:2)

20 g of the polysiloxane from example 5 is mixed with 4.64 g of N,N-di-n-butylaminomethyltriethoxysilane at room temperature while stirring.

Example 6b (Preparation of an Inventive Polysiloxane (with SH:Vi~1:2)

20 g of the polysiloxane from example 5 is mixed with 4.4 g of N-cyclohexylaminomethyltriethoxysilane at room temperature while stirring.

Example 7—Preparation of an Organo(Poly)Siloxane (A)

7a) (Preparation of a Polysiloxane (V) with SH:Vi 1:2) and 2*0.01% by Weight of PNCl$_2$ Cat A 2 l flange flask with magnetically coupled glass paddle stirrer, dropping funnel, thermometer, and reflux condenser with column head is charged with 56 g of vinylmethyldichlorosilane (99%, Wacker Chemie AG), and 143 g of an α,ω-dihydroxydimethylpolysiloxane having a 25 mol % proportion of methylvinylsiloxy units (Wacker Chemie AG) and 313.5 g of an α,ω-dihydroxydimethylpolysiloxane having an average of 27 dimethylsiloxy units (Wacker Chemie AG) are metered in successively at 25-27° C., in each case over the course of half an hour. 0.5 g of 3,5-di-tert-butyl-4-hydroxytoluene (99%, Sigma-Aldrich) is added as stabilizer and the mixture is then heated to 100° C. and stirred at this temperature for one hour. 0.6 g of 10% "PNCl2" solution in xylene (Wacker Chemie AG, equilibration catalyst) (corresponding to 0.01% by weight based on the total mixture) is then added. 68 g of 3-thiopropylmethyldimethoxysilane 95%, Sigma-Aldrich) is metered into the clear reaction mixture over a 30-minute period and then another 0.6 g of 10% "PNCl2" solution is added. The mixture is stirred at 100° C. for a further 2 hours, cooled to 80° C., and a suspension of 12 g of magnesium oxide in 140 g of deionized water then added. The reaction mixture is then stirred at 75° C.-80° C. for 75 minutes, after which all the volatiles are distilled off at 1 hPa up to 110° C. The residue is cooled to room temperature and then filtered through a pressure suction filter. A clear liquid having a viscosity of 42 mPa·s is obtained as the filtrate. The composition of the product is determined by $^1$H and $^{29}$Si NMR. This gives the following average composition:

X-Me$_2$SiO$_{1/2}$:X-MeViSiO$_{1/2}$:Me$_2$SiO$_{2/2}$:MeViSiO$_{2/2}$: MeSi(CH$_2$CH$_2$CH$_2$—SH)O$_{2/2}$=1.74:0.26:21:3:1.7

X=39% OH, 61% OMe

7b) Repetition of Example 7a) with 2*0.1% by Weight of "PNCl2" Based on the Total Mixture Workup in analogous manner results in the isolation of a clear liquid having a viscosity of 65 mPa·s. The composition of the product is determined by $^1$H and $^{29}$Si NMR. This gives the following average composition:

X-Me$_2$SiO$_{1/2}$:X-MeViSiO$_{1/2}$:Me$_2$SiO$_{2/2}$:MeViSiO$_{2/2}$: MeSi(CH$_2$CH$_2$CH$_2$—SH)O$_{2/2}$=1.67:0.33:27:3.8:2

X=64% OH, 36% OMe

7c)—Preparation of an Organo(Poly)Siloxane (A)

60 g of the polymer from example 7a) (according to NMR analysis: 21 mmol SiOH) is mixed at room temperature, while stirring, with 7.7 g (25 mmol) of N,N-di-n-butylaminomethyltriethoxysilane, 11.2 g (59 mmol) of vinyltriethoxysilane (99%, Wacker Chemie AG), and 0.3 g of 3,5-di-tert-butyl-4-hydroxytoluene (99%, Sigma-Aldrich) as stabilizer. Immediately thereafter, $^1$H- and $^{29}$Si-NMR spectra of the clear mixture are recorded. The molar ratio of the individual siloxy units is calculated from the integrals. Normalization to 2 end groups gives the following composition: MeO-Me$_2$SiO$_{1/2}$:MeO-MeViSiO$_{1/2}$:Me$_2$SiO$_{2/2}$:MeViSiO$_{2/2}$:MeSi(CH$_2$CH$_2$CH$_2$—SH)O$_{2/2}$:(nBu)$_2$N—CH$_2$—Si(OEt)$_2$O$_{1/2}$: ViSi(OEt)$_2$O$_{1/2}$:(nBu)$_2$N—CH$_2$—Si(OEt)$_3$:ViSi(OEt)$_3$=1.1: 0.1:27:3.3:1.7:0.6:0.2:0.2:2=>60% MeO, 30% DBA-DEO, 10% Vi-DEO.

According to this, all the SiOH groups have reacted with the trialkoxysilane, whereas the excess amount of silane and the methoxy end groups are present unchanged. In air (23° C./50% relative humidity), the polymer crosslinks within a few hours to form a gel-like vulcanizate. Upon UV irradiation in a UV chamber (Uvacube, Hönle, Hg halide lamp, 290-415 nm, 2000 W), the mixture of the polymer containing 1% by weight of Darocur 1173 undergoes crosslinking to a clear vulcanizate within 15 seconds.

Crosslinking of Polymer from Example 6

1% by weight of 2-methyl-1-phenyl-propan-2-ol-1-one (Darocur 1173) or of 1-hydroxycyclohexyl phenyl ketone (Omnirad 184), or of benzophenone (Omnirad BP Flakes) or of 2,2-dimethoxy-2-phenylacetophenone (Omnirad BDK) (all photoinitiators are commercially available from IGM, N.C.) is added to the siloxane from example 6a or 6b. The mixture, a clear, colorless oil having a viscosity of <1000 mPa·s, is applied to a polyester film in a layer thickness of 0.1 mm using a doctor blade (from Byk Inc.). The coated polyester substrate is then irradiated in the presence of air. Irrespective of the photoinitiator, the coating hardens completely after 30 seconds of ultraviolet irradiation in a UV chamber (Uvacube 2000 from Hönle, equipped with a mercury metal halide (F lamp) light source 1000 mJ/cm2, in a wavelength range from 290 nm to 415 nm), forming a dry surface. When another sample is allowed to stand in a mold for Shore hardness measurements in the same way in the presence of air (50% relative humidity, 23° C.) and with exclusion of light, skin formation (tack-free) occurs within less than 40 minutes. Immediately after UV crosslinking, the Shore 00 hardness of the vulcanizate is 50; after subsequent storage of the vulcanizate for one week at 23° C. and 50% relative humidity, moisture crosslinking results in a maximum of 65 being reached.

Storage Test:

The mixtures of the polymers 6a) and 6b), each containing 1 percent by weight of Omnirad BDK or benzophenone, show unchanged UV crosslinking behavior and moisture crosslinking behavior after storage for 2 weeks at 70° C. in a closed vessel with exclusion of light.

For automated testing of adhesion on the coated printed circuit boards, 1% Elastosil® Color Paste FL UV Fluorescent dye from Wacker is incorporated into the appropriate formulation.

Testing:

The above examples are tested using commercial printed circuit boards (Uxcell® 3 cm×7 cm FR-4). These circuit board substrates are prototypes that are tin-printed on both sides. Before coating, 50 µl of flux (NC265LR) was applied and dried overnight on the test surface. Siloxane P2 and PI are mixed as described above, then the applied coatings are first cured with UV light and the samples stored under atmospheric humidity for 4 days to cure completely. Fully cured printed circuit boards are tested in respect of heat and humidity (85° C./85% RH, over two weeks). The thermal stability (150° C., over 2 weeks) and temperature changes (1000 hours-40° C./140° C.) are also tested. After these tests, the adhesion is evaluated according to the ASTM 3359-09 standard cross hatch method, a robust method for determining the adhesion of coatings on substrates. This is done by cutting into the fully cured coating with a scalpel in a grid pattern down to the substrate surface. A standard adhesive tape is then applied to the vulcanizate surface and pulled off. Adhesion is then rated/quantified according to the number of squares remaining on the basis of a pictogram described in ASTM 3359-09. The results are shown in the table below. In the testing of prototype boards with the above examples, excellent adhesion was observed even without the addition of adhesion promoters, as was excellent stability of vulcanizate strength and adhesion. The results are shown in Table 1.

TABLE 1

| Polymer | Photo-initiator | Adhesion immediately after UV + moisture curing | After 2 weeks at 150° C. | After 1000 h T-change cycles −40° C.-140° C. |
|---|---|---|---|---|
| 6a | 1% Omnirad BDK | 4 B[1)] | 4 B | 4 B |
| 6a | 1% Benzo-phenone | 5 B | 4 B | 4 B |
| 6b | 1% Omnirad BDK | 5 B | 5 B | 4 B |
| 6b | 1% Benzo-phenone | 4 B | 4 B | 5 B |

[1)]The scale ranges from 0 B (poor adhesion) to 5 B (best adhesion, no detachment from the substrate anywhere)

The invention claimed is:

1. An organo(poly)siloxane (A) consisting of units of general formula (I)

$$R_nSiO_{(4-n/2)} \quad (I)$$

where n is 0, 1, 2 or 3, wherein the proportion of units in which n=0 is not more than 50 mol % and the proportion of units in which n=1 is not more than 60 mol %, in each case based on all units of general formula (I), R is selected from the radicals $R^1$, $-OR^2$, $R^u$, $R^S$ and Q, where $R^1$ denotes a monovalent substituted or unsubstituted hydrocarbon radical having 1 to 18 carbon atoms, $R^2$ denotes a hydrogen atom or a monovalent substituted or unsubstituted hydrocarbon radical having 1 to 6 carbon atoms, $R^u$ denotes a monovalent aliphatic unsaturated hydrocarbon radical having 2 to 18 carbon atoms, $R^S$ denotes a monovalent thiol-functionalized hydrocarbon radical having 1 to 18 carbon atoms, Q is a nitrogen functional group of formula (II)

$$-CR^5R^6-NR^4R^3 \quad (II),$$

where $R^3$ and $R^4$ each independently denote hydrogen or a substituted or unsubstituted hydrocarbon radical having 1 to 18 carbon atoms and $R^5$ and $R^6$ each independently denote hydrogen or the methyl radical, with the proviso that the organo (poly) siloxane (A) contains per molecule at least one unit of general formula (III), $$Q-Si(OR^7)_2O_{1/2} \quad (III)$$

in which $R^7$ is as defined for $R^2$;

at least 1 aliphatically unsaturated radical $R^u$;

and at least 2 thiol-functionalized groups $R^S$.

2. The organo(poly)siloxane (A) as claimed in claim 1, in which $R^u$ is a vinyl or allyl radical.

3. The organo(poly)siloxane (A) as claimed in claim 1, in which the radical $R^S$ denotes a linear thioalkyl radical having 3 to 6 carbon atoms.

4. The organo(poly)siloxane (A) as claimed in claim 1, in which the units $-NR^4R^3$ are selected from di-n-butylamino, anilino, cyclohexylamino, and N-morpholino units.

5. The organo(poly)siloxane (A) as claimed in claim 1, which have 10 to 400 units of general formula (I).

6. The organo(poly)siloxane (A) as claimed in claim 1, in which at least 0.5 mol % of all units of general formula (I) are a unit of general formula (III).

7. The organo (poly) siloxane (A) as claimed in claim 1, in which the molar ratio of the radicals $R^S$ to the radicals $R^u$ is within a range between 0.3 and 5.

8. A process for preparing the organo(poly)siloxanes (A) as claimed in claim 1, in which alkoxysilanes of general formula (IV)

$$(R^2O)_3Si-CR^5R^6-NR^4R^3 \quad (IV)$$

undergo condensation with silanol groups of a polysiloxane (V) that contains silanol groups and both aliphatically unsaturated radicals $R^u$ and thiol-functionalized groups $R^S$.

9. A moisture-and radiation-crosslinkable organo(poly)siloxane mixture (M) comprising an organo(poly)siloxane (A) as claimed in claim 1.

10. The organo(poly)siloxane mixture (M) as claimed in claim 9, which comprises a photoinitiator (B).

11. The organo(poly)siloxane mixture (M) as claimed in claim 9, which comprises a stabilizer (C) to avoid unwanted free-radical reactions.

* * * * *